(12) United States Patent
Akiu et al.

(10) Patent No.: US 8,391,184 B2
(45) Date of Patent: Mar. 5, 2013

(54) METHOD OF UPDATING ROUTING TABLE, DATA TRANSFER APPARATUS, AND PROGRAM

(75) Inventors: Susumu Akiu, Kawasaki (JP);
Takaharu Ishizuka, Kawasaki (JP);
Takeshi Owaki, Kawasaki (JP); Atsushi Morosawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 294 days.

(21) Appl. No.: 12/846,175

(22) Filed: Jul. 29, 2010

(65) Prior Publication Data

US 2011/0026524 A1 Feb. 3, 2011

(30) Foreign Application Priority Data

Jul. 31, 2009 (JP) .................................. 2009-179710

(51) Int. Cl.
*H04L 12/28* (2006.01)

(52) U.S. Cl. ...................................................... 370/255

(58) Field of Classification Search ............. 370/395.21, 370/428, 392
See application file for complete search history.

(56) References Cited

U.S. PATENT DOCUMENTS

2006/0245433 A1* 11/2006 Berg et al. ................ 370/395.31
2009/0274157 A1* 11/2009 Vaidya et al. .................. 370/400

FOREIGN PATENT DOCUMENTS

JP 2000-22734 A 1/2000
JP 4131263 8/2008

* cited by examiner

*Primary Examiner* — Kevin C Harper
*Assistant Examiner* — Henry Baron
(74) *Attorney, Agent, or Firm* — Fujitsu Patent Center

(57) ABSTRACT

A method of updating a routing table includes: receiving, from an issue-source node, a write packet that includes update data for updating the routing table; attempting to recognize, based upon contents of the write packet, a partition in which the issue-source node is included; determining whether to permit updating the routing table based upon (1) whether the partition including the source node is recognized and (2) whether port information and partition information in the update data are stored in the routing table; and updating the routing table when updating is permitted.

8 Claims, 16 Drawing Sheets

FIG. 1B

| NID | Valid | PORT | PARTITION |
|---|---|---|---|
| 11 | 1 | Pa | X |
| 12 | 1 | Pb | Y |
| 13 | 1 | Pc | X |
| 14 | 1 | Pd | Y |
| 15 | 0 | — | — |

120

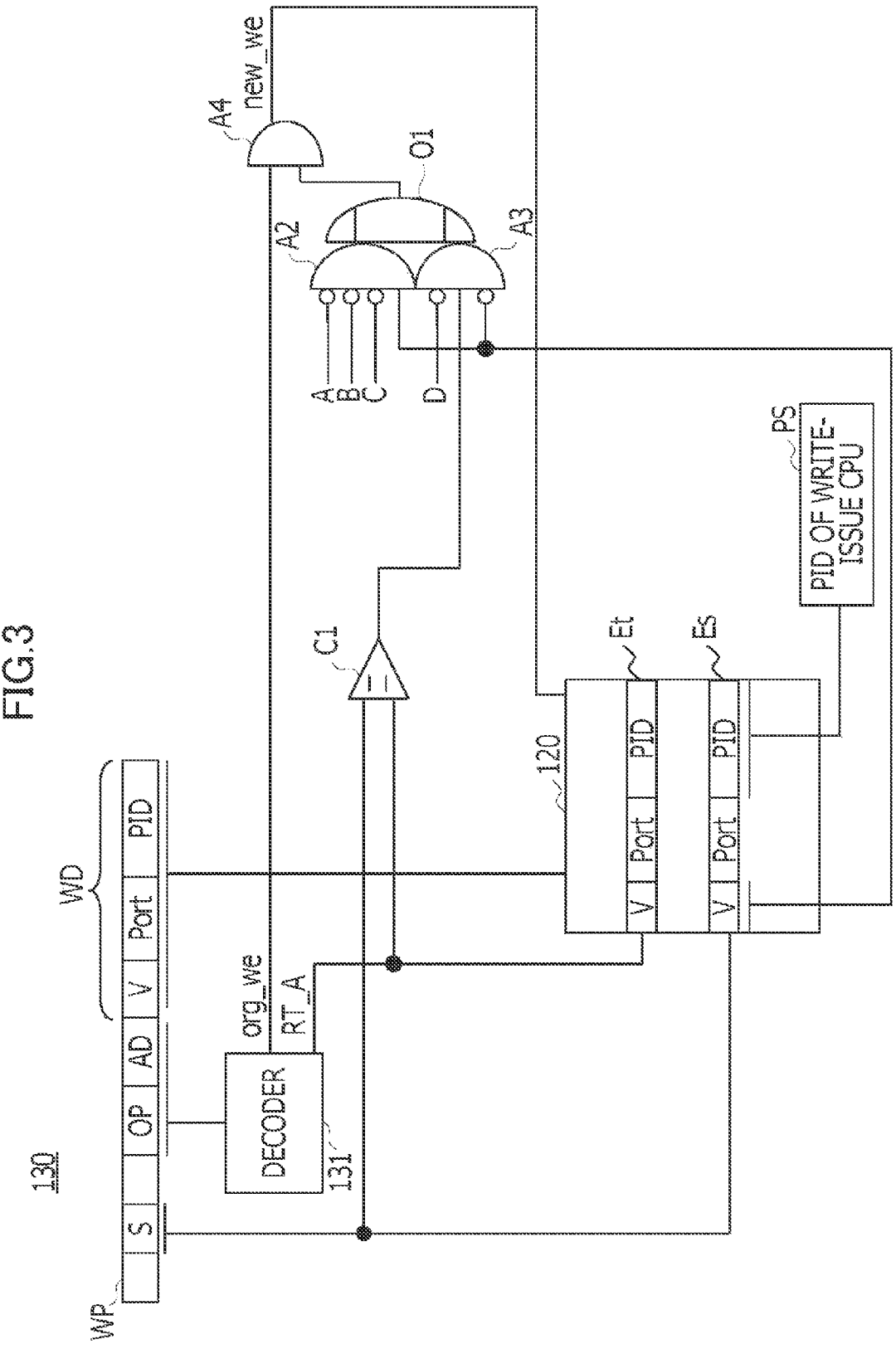

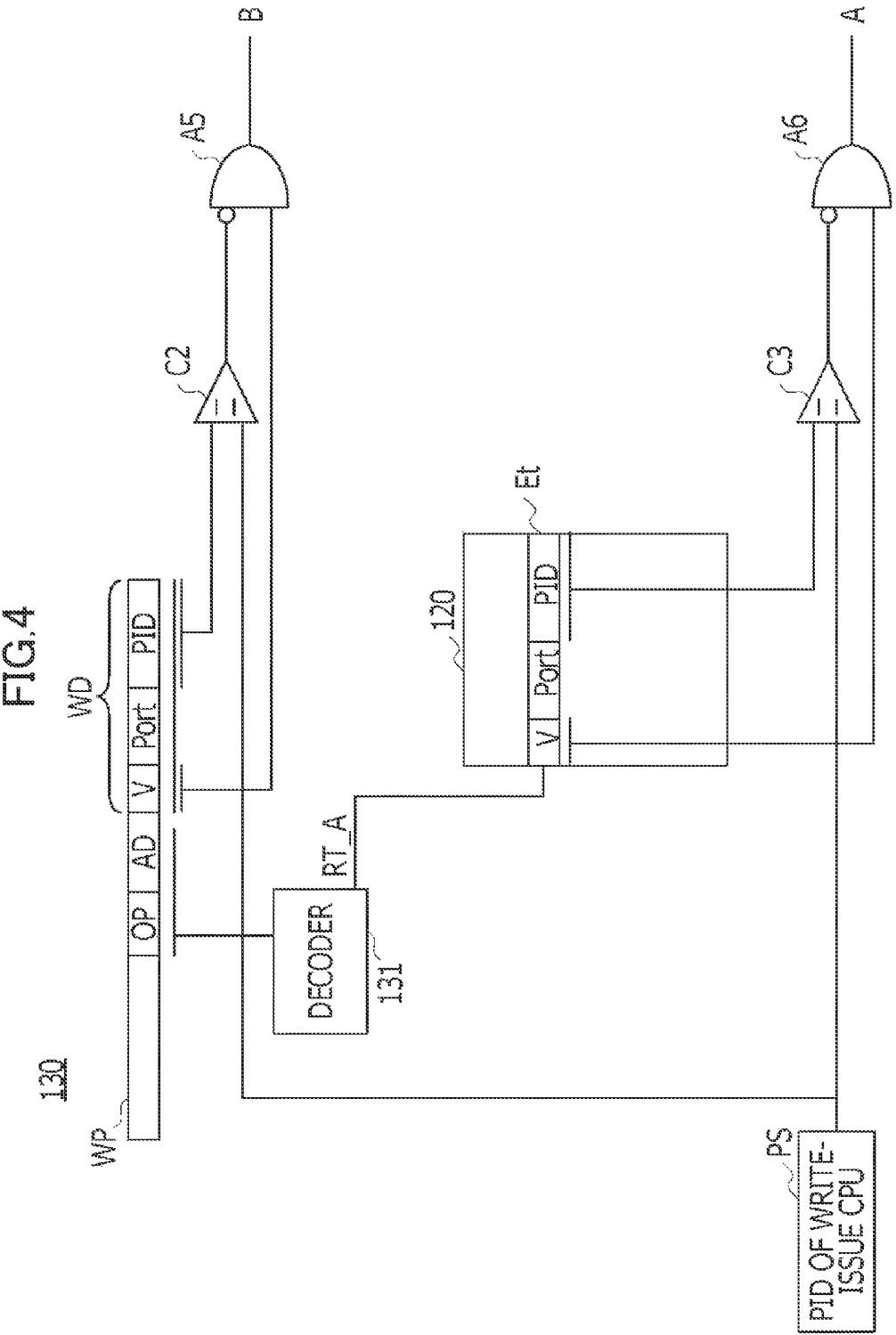

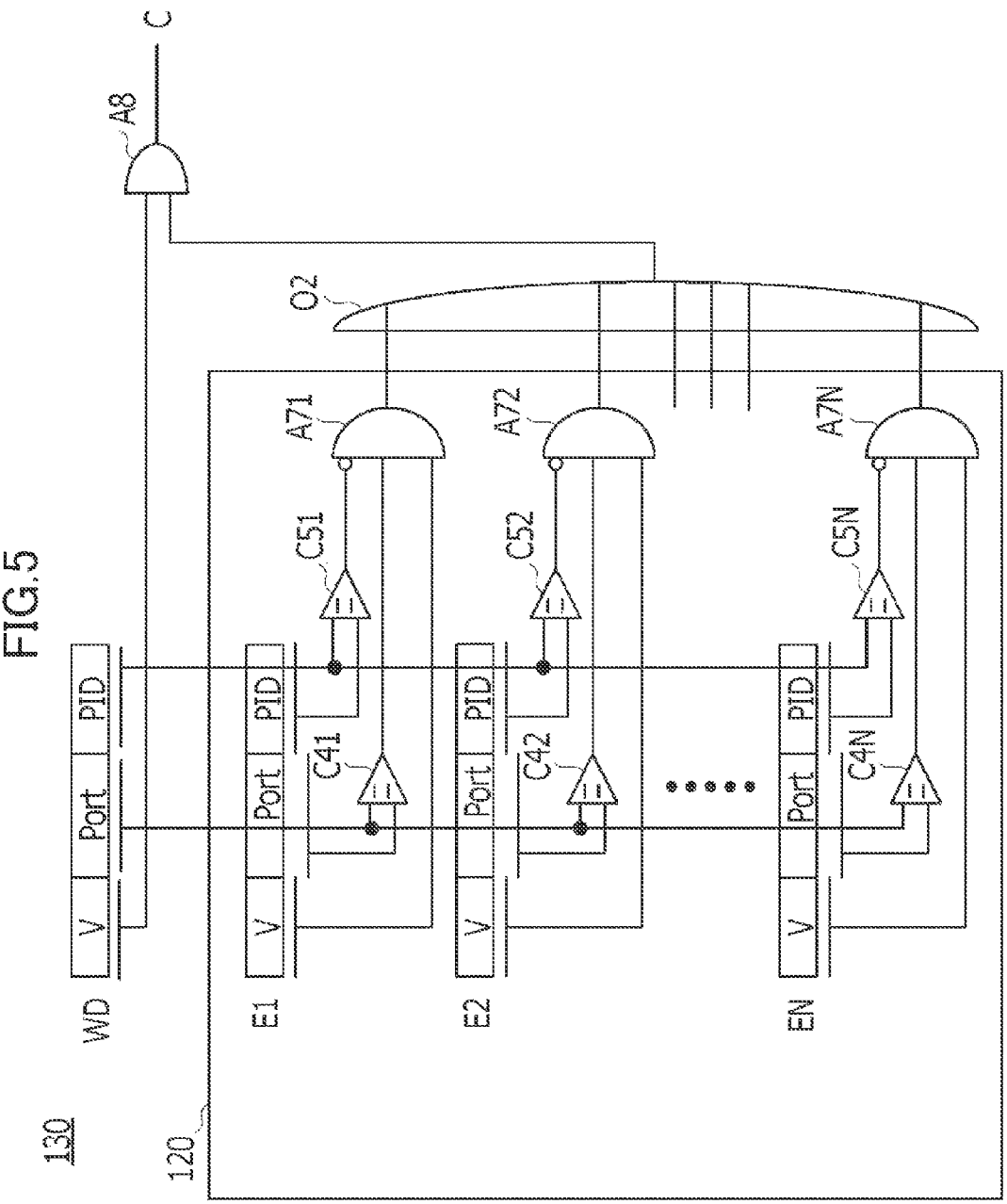

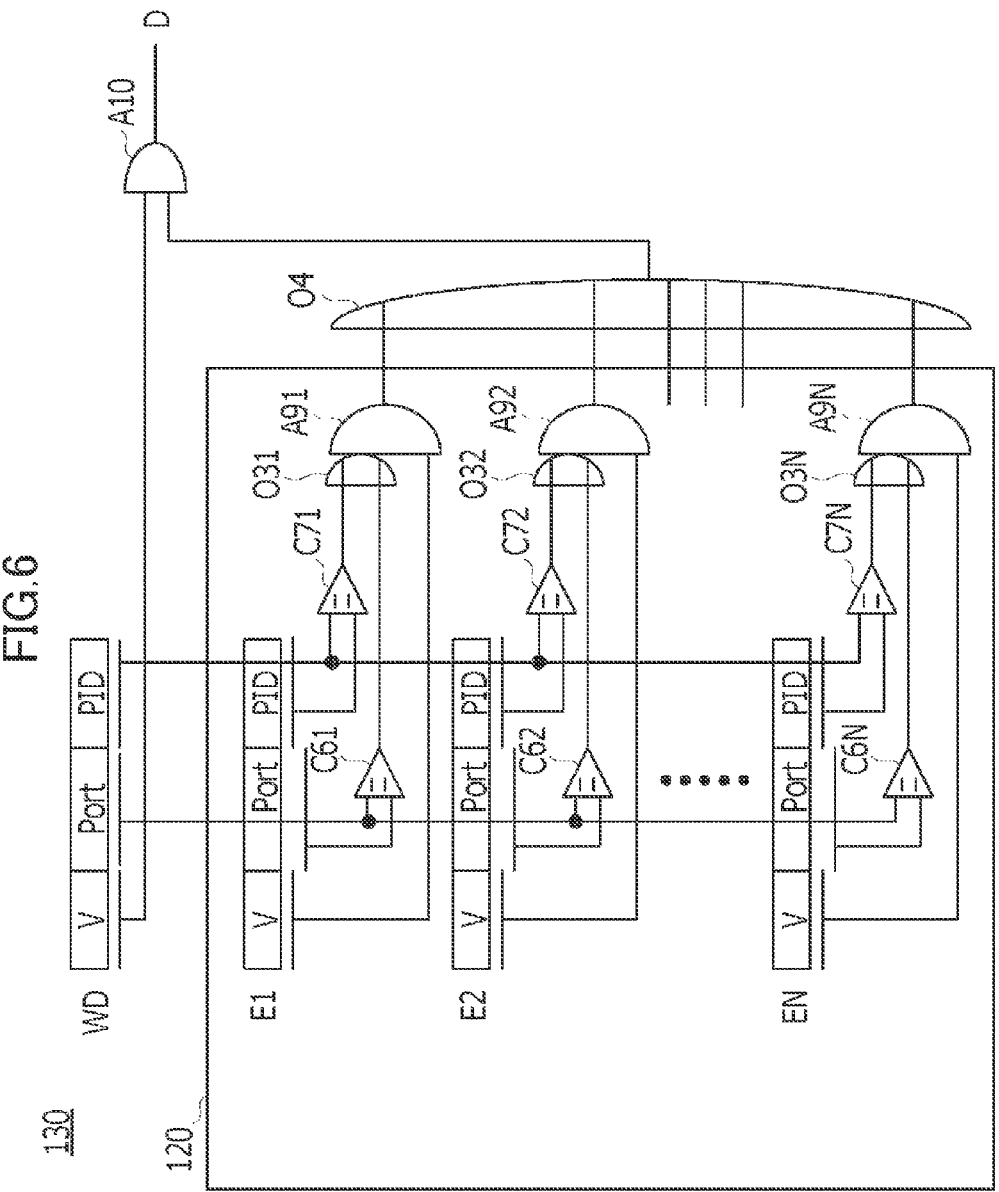

FIG.7A

| FIG.7A |
|--------|
| FIG.7B |

FIG.7A

| ROUTING TABLE BEFORE UPDATE | | | | ROUTING TABLE BEFORE UPDATE | | | EMBODIMENT | REFERENCE EXAMPLE |
|---|---|---|---|---|---|---|---|---|
| Valid 1: VALID 0: INVALID | Port | Partition SAME PARTITION AS THAT OF WRITE-PACKET-ISSUE SOURCE? Y: SAME N: DIFFERENT | V 1: VALID 0: INVALID | Port IS USED BY ANOTHER PARTITION? Y: USED BY ANOTHER PARTITION N: USED BY THE OWN PARTITION OR UNUSED | Partition SAME PARTITION AS THAT OF WRITE-PACKET-ISSUE SOURCE? Y: SAME N: DIFFERENT | PID SAME PARTITION AS THAT OF WRITE-PACKET-ISSUE SOURCE? Y: SAME N: DIFFERENT | ○: UPDATE PERMITTED ×: UPDATE UNPERMITTED | ○: UPDATE PERMITTED ×: UPDATE UNPERMITTED |
| 1 | | N | 1 | N | | Y | × | ○ |
| 1 | | N | 1 | N | | N | × | ○ |
| 1 | | N | 1 | Y | | Y | × | ○ |
| 1 | | N | 0 | Y | | N | × | ○ |
| 1 | | N | 0 | N | | Y | × | ○ |
| 1 | | N | 0 | N | | N | × | ○ |
| 1 | | N | 0 | Y | | Y | × | ○ |
| 1 | | N | 0 | Y | | N | × | ○ |
| 1 | | Y | 0 | N | | Y | ○ | ○ |
| 1 | | Y | 0 | Y | | N | ○ | ○ |
| 1 | | Y | 0 | Y | | N | ○ | ○ |

| ENTRY OF ROUTING TABLE TO BE UPDATED | WRITE DATA WD | | | | EMBODIMENT | REFERENCE EXAMPLE |
|---|---|---|---|---|---|---|
| UPDATE TARGET IS ENTRY OF OWN NID? Y: OWN ENTRY N: NOT OWN ENTRY | V 1: VALID 0: INVALID | HAS ALREADY BEEN USED? Y: USED N: UNUSED | Port HAS ALREADY BEEN USED? Y: USED N: UNUSED | PID HAS ALREADY BEEN USED? Y: USED N: UNUSED | ○: UPDATE PERMITTED ×: UPDATE UNPERMITTED | ○: UPDATE PERMITTED ×: UPDATE UNPERMITTED |
| × | 1 | | N | Y | × | ○ |
| × | 1 | | N | N | × | ○ |
| × | 1 | | Y | Y | × | ○ |
| × | 1 | | Y | N | × | ○ |
| × | 0 | | N | Y | × | ○ N4 |
| × | 0 | | N | N | × | ○ N4 |
| × | 0 | | Y | Y | × | ○ N4 |
| × | 0 | | Y | N | × | ○ |
| × | 0 | | N | Y | × | ○ N5 |
| × | 0 | | N | N | × | ○ N5 |
| × | 0 | | Y | Y | × | ○ N5 |
| × | 0 | | Y | N | × | ○ N5 |

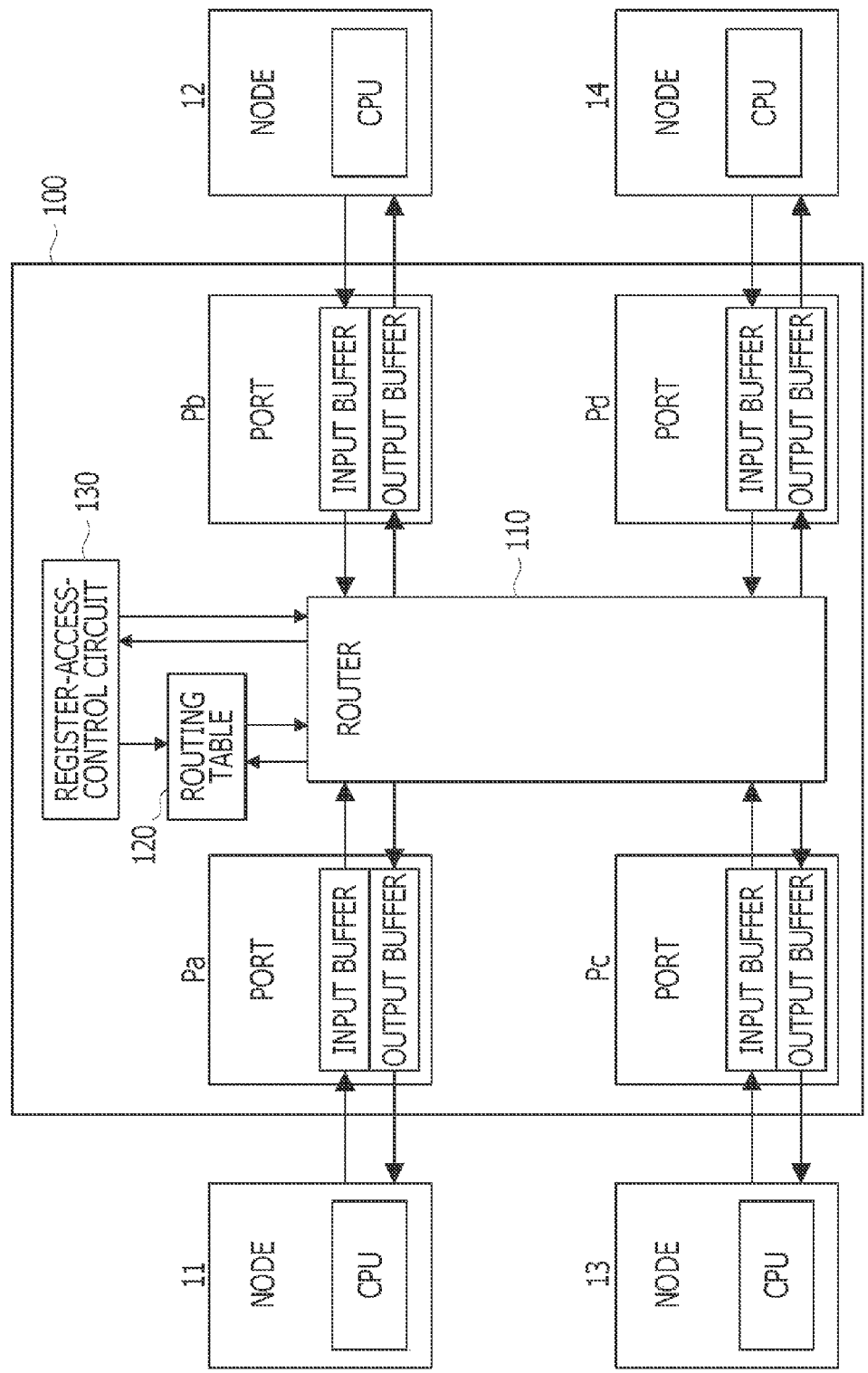

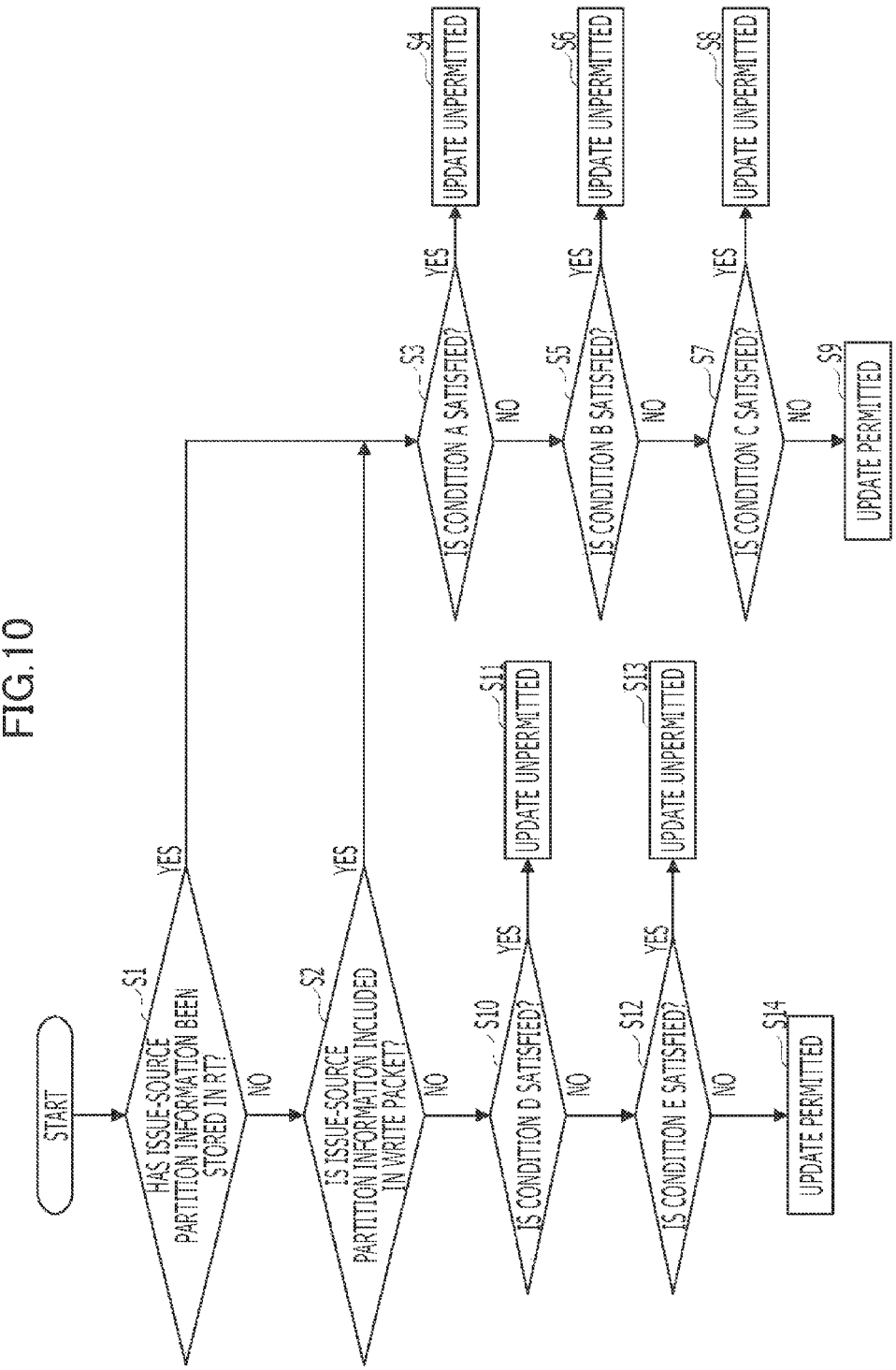

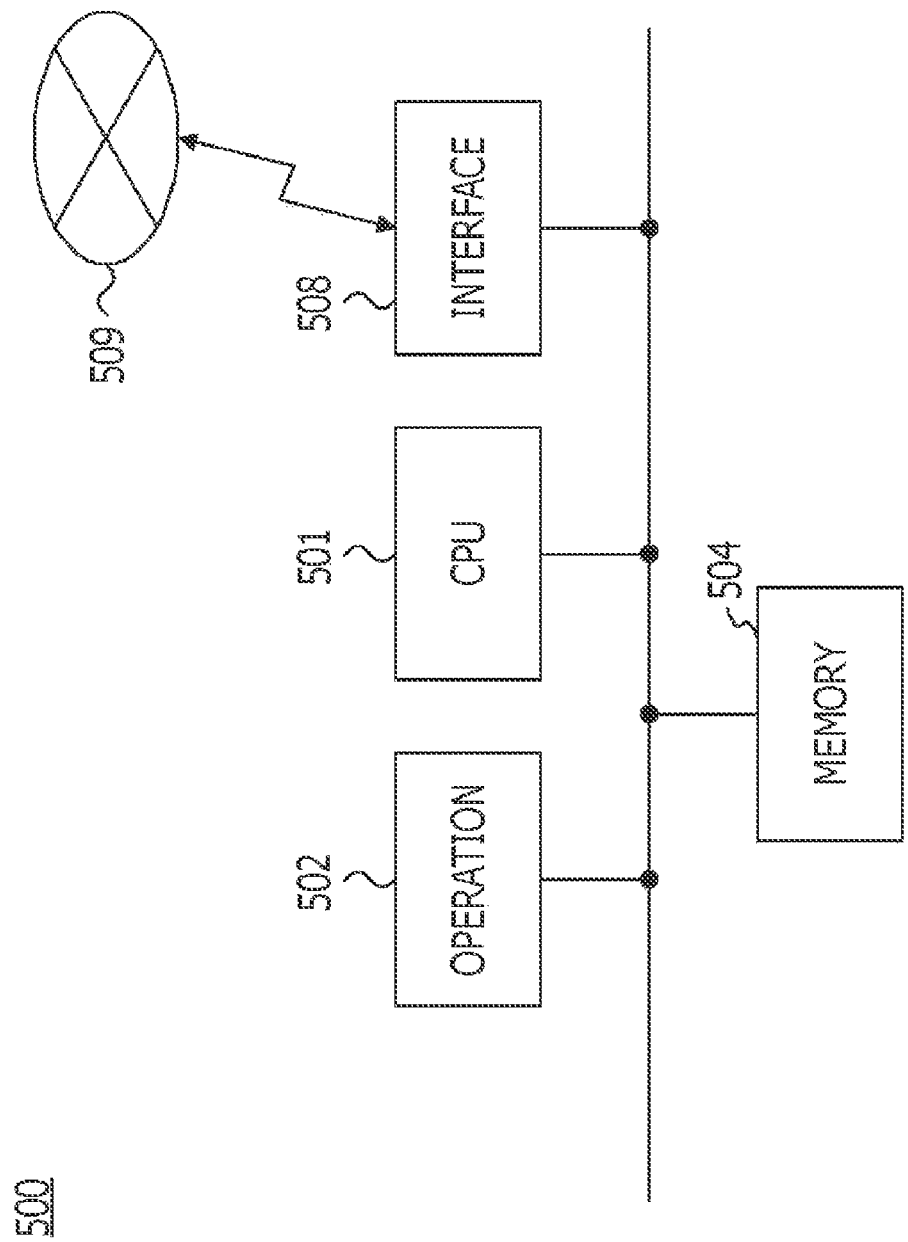

METHOD OF UPDATING ROUTING TABLE, DATA TRANSFER APPARATUS, AND PROGRAM

CROSS-REFERENCE TO RELATED APPLICATION

This application is based upon and claims the benefit of priority of the prior Japanese Patent Application No. 2009-179710, filed on Jul. 31, 2009, the entire contents of which are incorporated herein by reference.

FIELD

An embodiment of the present invention discussed herein relates to a data transfer apparatus.

BACKGROUND

A router network using TCP/IP includes network routing controllers controlling information transmission paths in a network, and network management apparatuses managing the network routing controllers are known. Also, in a router network, a network routing controller dynamically changes a routing table which is used in routing control with the use of a routing protocol is known.
[Patent Document 1] Japanese Unexamined Patent Application Publication No. 2000-22734
[Patent Document 2] Japanese Patent No. 4131263

A plurality of partitions can be set in a network, and a node in the network can be assigned to any of the partitions. In such a case, if a routing table is mistakenly updated, another partition might be affected depending on an aspect of an error.

SUMMARY

According to an aspect of the invention, a method of updating a routing table includes: receiving, from an issue-source node, a write packet that includes update data for updating the routing table; attempting to recognize, based upon contents of the write packet, a partition in which the issue-source node is included; determining whether or not to permit updating the routing table based upon (1) whether the partition including the source node is recognized and (2) whether port information and partition information in the update data are stored in the routing table; and updating the routing table when updating is permitted

BRIEF DESCRIPTION OF THE DRAWINGS

FIG. 1B illustrates an example of a structure of a routing table.
FIG. 3 illustrates an example of a configuration of a determination circuit.
FIG. 4 illustrates an example of a configuration of a determination circuit.
FIG. 5 illustrates an example of a configuration of a determination circuit.
FIG. 6 illustrates an example of a configuration of a determination circuit.

FIG. 7A and FIG. 7B are diagrams illustrating update-enable/disable states of a routing table according to an embodiment and a reference example.
FIG. 8 is a diagram illustrating update-enable/disable states of a routing table according to an embodiment and a reference example.
FIG. 9 illustrates a configuration of a crossbar according to another embodiment.
FIG. 10 is a flowchart illustrating a method of updating a routing table according to an embodiment.
FIG. 12 illustrates an example of a computer executing update of a routing table according to an embodiment.

DESCRIPTION OF EMBODIMENTS

Figure 1A:
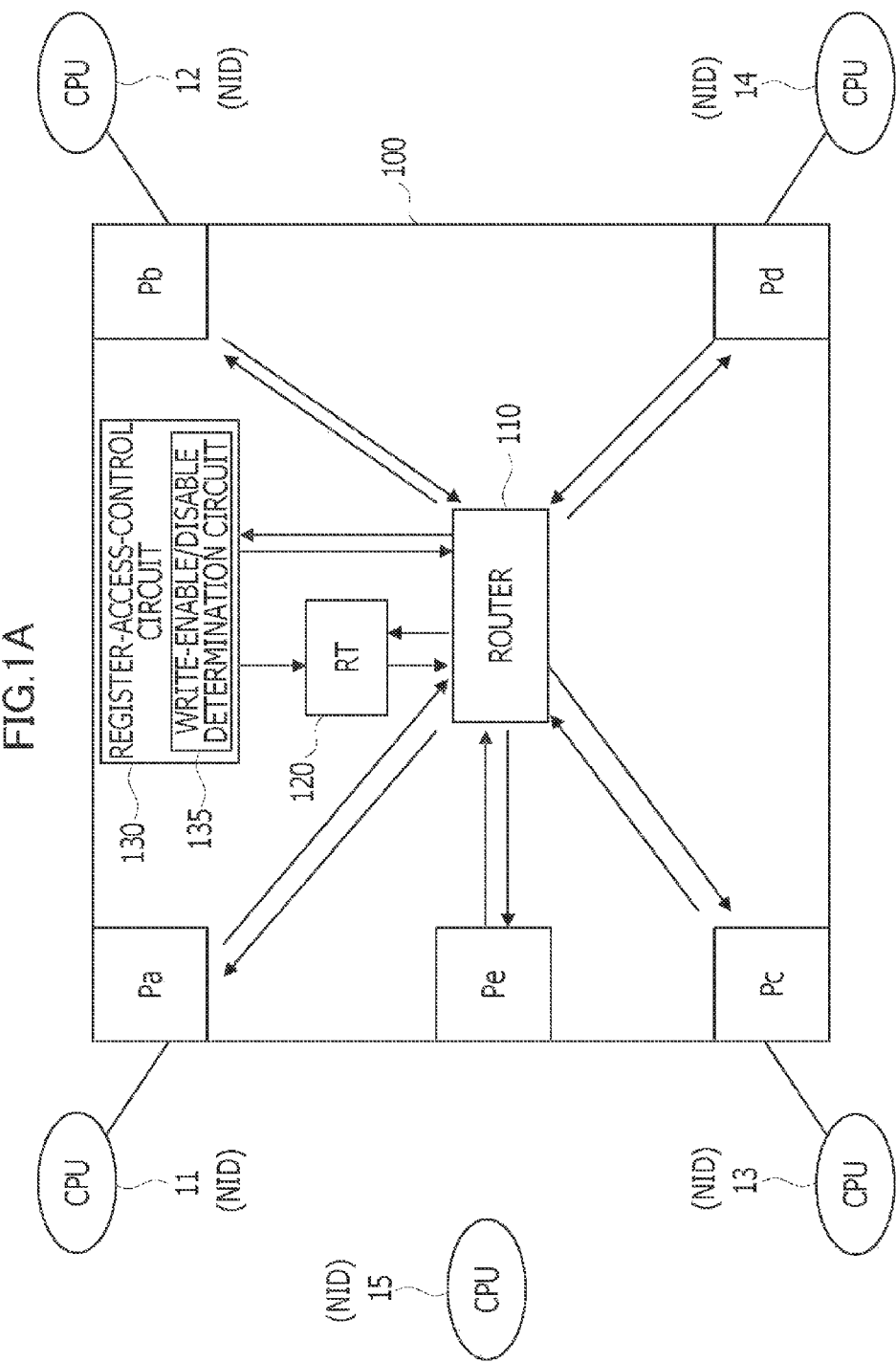
FIG. 1A illustrates a configuration of a crossbar according to an embodiment.
Figure 1C:
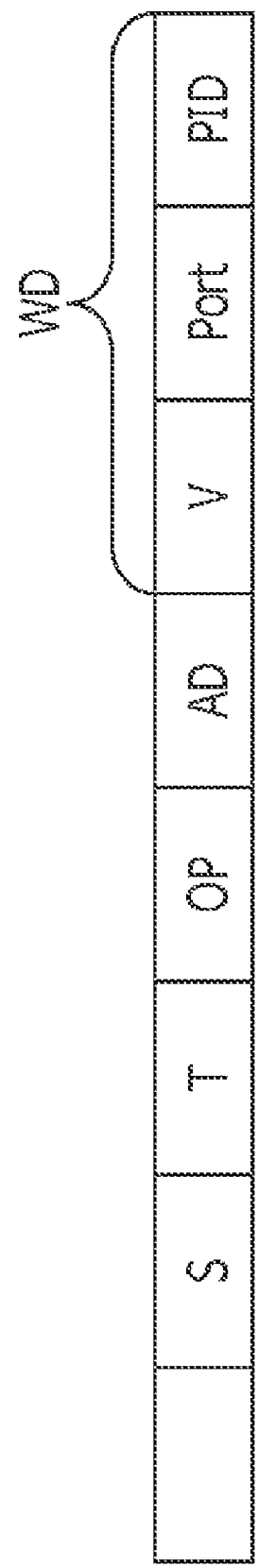
FIG. 1C illustrates an example of a structure of transfer data handled by the crossbar.

A detailed description of a data transfer system according to an embodiment of the present invention will be given with reference to the drawings.
FIG. 1A is a block diagram illustrating a configuration of a data transfer system according to an embodiment having a crossbar. FIG. 1B illustrates example contents of a routing table. FIG. 1C illustrates an example of transfer data handled by the data transfer system illustrated in FIG. 1A.
The data transfer system illustrated in FIG. 1A has a crossbar 100 mutually connecting a plurality of nodes 11, 12, 13, and 14. The crossbar 100 includes a memory that stores a routing table (RT) 120. FIG. 1B illustrates example contents of a routing table, e.g., RT 120. In RT 120, each row contains information corresponding to a given node. Each row (also known as entry) in RT 120 includes a node ID field (hereinafter referred to as an NID) field and port field indicating which of ports Pa, Pb, Pc, and Pd of the crossbar 100 is connected to the given node. As illustrated in FIG. 1B, any one of NIDs 11, 12, 13, and 14 and any one of ports Pa, Pb, Pc, and Pd can be related in the routing table 120 to each other, respectively. The router 110 relays packets mutually sent and received between the nodes using the routing table 120.
A register-access-control circuit 130 controls updating of the routing table 120. A determination circuit (hereinafter referred to as determination circuit) 135 determines whether or not to permit updating of the routing table 120. In this regard, the crossbar 100 in FIG. 1A has a port Pe to which a node is not connected.
Among information included in the routing table 120 in FIG. 1B, each row further includes a Valid field (hereinafter also referred to as "V field") for recording information indicating whether data populating the fields of the entry is valid or not. If a value set in the V field is "1", it means that the corresponding entry is valid. If the V field has a value of "0", it means that the corresponding entry is invalid. In the example in FIG. 1B, "1" is set in the Valid field corresponding to each of NID 11 to NID 14. On the other hand, "0" is set in the Valid field of the entry corresponding to NID 15, which is not connected to any one of the ports of the crossbar 100 as illustrated in FIG. 1A.
Each row of the routing table 120 further includes a partition field for recording information indicating a partition to which the node represented by the row pertains. In the example in FIG. 1B, NID 11 and NID 13 pertain to same partition X, and the NID 12 and NID 14 pertain to same partition Y.
FIG. 1C illustrates an example of transfer data handled by the data transfer system. As illustrated in FIG. 1C, a field labeled "S", i.e., an S field, of the transfer data indicates an NID of a transfer-data issue source node. A field labeled "T", i.e., a T field, indicates an NID of a transfer destination node of transfer data, a field labeled "OP", i.e., an OP field, indicates an operation code, and a field labeled "AD", i.e., an AD field, indicates an address. A description related to an address will be given later.

Also included in the example of transfer data illustrated in FIG. 1C, are the fields labeled "V" (i.e., V field), "Port" (i.e., Port field) and "PID" (i.e., PID field). In the following, collectively, the V field, Port field and PID field will be referred to as write data WD. The V field, the Port field and the PID field of the transfer data correspond to the Valid field, Port field, the Partition field of the routing table 120 illustrated in FIG. 1B, respectively. Information intended to be written in the Valid field, the Port field and the Partition field of the routing table 120 is set in the V field, the Port field and the PID field, namely, the WD of the transfer data, respectively.

The nodes 11, 12, 13, 14, and 15 are assigned to any one of multiple partitions. Each node pertaining to any one of the partitions accesses to the routing table 120. The router 110 compares an NID of a transfer-data issue source node indicated by S field of transfer data passing through the crossbar 100 and an NID of a transfer-data destination node indicated by the T field with corresponding fields in the routing table 120. The router 110 recognizes a partition to which the transfer-data issue source node pertains and a partition to which the transfer-data destination node pertains by referring to the routing table 120. Based on the recognition result of the partitions each node pertains, the router 110 determines whether or not the transfer data is data to be transferred to a destination node pertaining to a partition as same as a partition to which the issue-source node pertains.

As a result of the determination, if the transfer data from the issue-source node is transfer data to be transferred to a node pertaining to a same partition as the issue-source node, the router 110 transfers the transfer data to the transfer destination node. On the other hand, if the transfer data is data to be transferred to a node pertaining to a partition different from that of the issue-source node, the router 110 does not transfer the transfer data. As a result, an erroneous transmission of transfer data to a node pertaining to a partition different from the partition to which the issue-source node pertains can be avoided if not prevented.

The routing table 120 may be updated, if a node is added to or deleted from the routing table 120 of the crossbar 100 in response to a dynamic configuration change. When updating the routing table 120, a node may mistakenly update the routing table 120 because of an error of the program, etc.

The dynamic configuration change is also called a "Dynamic Reconfiguration (DR)", which means an operation that changes a partition configuration dynamically without stopping the data transfer system.

The following two cases are an example of cases where another partition is affected by mistakenly updating the routing table 120.

(1) Updating an entry of a partition different from a partition to which a write-packet-issue source node pertains among the information recorded in the routing table 120

(2) Updating the routing table 120 such that transfer data having a destination node pertaining to a same partition as that of a write-packet-issue source node is transferred to a node pertaining to a different partition In the present embodiment, updating of the routing table is not permitted even in the case of (1) or (2).

A data transfer system according to the embodiment has the following configuration. In the following description, a packet issued by a node in order to update the routing table 120 is called a "write packet". The write packet has a structure illustrated in FIG. 1C for example, and includes write data WD.

When the router 110 of the crossbar 100 receives a write packet from an issue-source node, the router 110 compares Port field in WD of a received write packet with Port field in the routing table 120. Information to be written into the Port field in a corresponding entry of the routing table 120 is contained into Port field in the WD. If an entry of the port indicated by the Port field in the WD exists in the routing table 120, the Partition field in that entry is replaced by the contents of the PID field of the WD, and the contents of the Valid field in the routing table is replaced by the contents of the V field of the WD.

A description of a case where the router 110 can recognize a partition to which an issue-source node (hereinafter referred to as an "issue source node") of a write packet pertains will be given.

When an issue-source node attempts to update the routing table 120, whether a partition to which an entry to be updated (hereinafter referred to as an "update-target entry") pertains matches a partition to which an issue-source node pertains or not is determined. If both of the partitions match, updating the routing table 120 is permitted, that is to say, updating the entry pertaining to a same partition as that of the issue-source node of the write packet is permitted. Whether the partitions match or not is determined by comparing a partition to which an update-target entry pertains and a partition to which an issue-source node pertains. The partition to which an update-target entry pertains can be recognized by referring to the Partition field of an update-target entry. A description a method of the router 110 recognizing a partition to which the issue-source node pertains will be given later.

Updating of an entry of a partition to which an issue-source node pertains includes a case where an entry of a partition to which an issue-source node pertains is invalidated. When a Valid field in the routing table 120 is set to "0", the corresponding entry is invalidated. By invalidating an entry, an access to a node having the NID of that entry is prohibited, and the node can be isolated from the partition.

In the other case, updating of an entry that does not pertain to any of the partitions, that is to say, an invalid entry is permitted. For example, in FIG. 1B, Valid field of the entry corresponding to the node having NID 15 is "0". Accordingly, the entry corresponding to the node of NID 15 is invalid, and the node having NID 15 does not pertain to any one of partitions. Thus, updating of the entry corresponding to the node of NID 15 is permitted.

On the other hand, updating of an entry pertaining to a partition different from the partition to which the issue-source node pertains is not permitted.

When a node pertaining to a partition is moved to another partition, the following operations are taken.

An entry of the NID possessed by a node of a partition to be moved is invalidated. That is to say, the Valid field corresponding to the node to be moved is updated to "0", and the node is isolated from the partition. Next, information indicating a destination partition is written in the Partition field of the invalidated entry, and the entry is validated. To validate an entry, the Valid field of the entry is updated to "1".

In the following cases, updating of an entry is permitted when the contents of an entry is changed while a valid entry is kept valid, or when an invalid entry is validated.

Whether a port indicated by the Port field of the WD has already been stored in the routing table 120 or not is determined. whether the port has been stored in the routing table 120 or not can be determined whether the entry corresponding to the port information indicated by the Port field of the WD is found in the routing table 120 or not. In the case where the port indicated by the Port field of the WD has not been stored in the routing table 120, that is to say, the port is not stored in the routing table 120, updating of the entry is permitted. If the port is not stored in the routing table, it means that the port is not used. Thus, if an unused port of the crossbar 100 will be newly used, updating of the corresponding entry is permitted.

On the other hand, in the case where the port indicated by the Port field of the WD has been stored in the routing table 120, whether the partition indicated by the PID field of the entry (hereinafter referred to as an "entry of that port") corresponding the port information indicated by the Port field of the WD matches the partition to which the issue-source node pertains or is determined. If both of the partitions match, updating the routing table is permitted. That is to say, in the case where an entry pertaining to a same partition as that of the issue-source node is updated, updating the routing table is permitted. In this case, the entry of the node pertaining to a same partition as that of the issue-source node is updated.

Whether or not the partition indicated by the PID field of the entry corresponding the port indicated by the Port field matches the partition to which the issue-source node pertains can be determined by the following procedure. First, the routing table 120 is referred, and the partition indicated by the PID field of the entry indicated by the port is recognized. Next, the partition to which the issue-source node pertains is recognized. How the router 110 recognizes the partition to which the issue-source node pertains will be described later. In this manner, the partition indicated by the recognized PID field and the partition to which the issue-source node pertains are compared, whether both of them match or not is determined.

On the other hand, in the case where the port indicated by the Port field of the WD has already been stored in the routing table 120, and the partition written in the PID field of the entry corresponding to that port is different from the partition to which the issue-source node pertains is attempted to be updated, updating of the routing table is not permitted. That is to say, in the case where the entry pertaining to a partition different from the partition to which the issue-source node pertains, updating of the routing table is not permitted.

In the case of (2) described above, the PID field of the WD and the partition to which the issue-source node pertains are compared with each other. How the router 110 recognizes the partition to which the issue-source node pertains will be described later. If both of the partitions match, updating of the routing table is permitted. On the other hand, if both of the partitions are different, updating of the routing table is not permitted. If the routing table is updated when the partitions are different, the updated entry pertains to a partition different from the partition to which the issue-source node pertains. Accordingly, by not permitting updating of the routing table in the case where the partitions are different, assigning the updated entry to a partition different from the partition including the issue-source node can be avoided if not prevented.

Next, a case where the router 110 cannot recognize the partition to which the issue-source node pertains will be described.

For example, the following two methods are examples of a method that the router 110 recognizes a partition to which the issue-source node pertains.

In a first method, in the case where a PID (hereinafter referred to as "Partition information") which is information indicating a partition to which the issue-source node pertains, is included in the write packet, the router 110 refers to the partition information. The router 110 can recognize a partition to which the issue-source node pertains.

In a second method, the router 110 refers to the routing table 120, and recognizes a partition to which the issue-source node pertains.

Accordingly, in the case where partition information corresponding to the issue-source node is not included in the write packet, and the routing table 120 does not include partition information corresponding to the issue-source node, the router 110 cannot recognize a partition to which the issue-source node pertains. The case where partition information on the partition to which the issue-source node pertains is not included in the routing table 120 includes a case in which an entry corresponding to the NID field indicating an issue-source node is not stored in the routing table 120, that is to say, an issue-source node is not stored in the routing table.

In this manner, in the case where information on the partition to which the issue-source node pertains is not included in the write packet, and the routing table 120 does not include information on the partition to which the issue-source node pertains, the router 110 cannot recognize the partition to which the issue-source node pertains. Even in such a case, if an NID of the issue-source node, that is to say, an NID of the S field of the write packet and an NID of an update-target entry match, updating of the routing table is permitted. When an entry in which corresponding NID field indicating an NID of an issue-source node is newly added to the routing table 120, updating of the routing table is permitted.

In the following, the case where an entry in which corresponding NID field indicates an NID of an issue-source node is newly added to the routing table 120 will be described. It is assumed that the routing table before addition of the entry is in a state illustrated in FIG. 1B, for example. In the state of FIG. 1B, both the Port field and the Partition field of the entry having an NID=15 are "–". Therefore, information is not set in each of the fields, and that entry is not currently used. An operator of an issue-source node recognizes a state of the routing table in advance, sets an address indicating the entry in the AD field in order to use the entry of NID=15, which is currently not used, and issues a write packet with an NID of the issue-source node is set to "15". That is to say, NID=15 is set in the S field in the issued write packet. As a result, the NID of the issue-source node, that is to say, the NID of the S field of the write packet and the NID of the update-target entry match, and thus updating of the routing table is permitted.

In the case where the router 110 cannot recognize the partition to which the issue-source node pertains, and the port indicated by the Port field of the WD has been stored in the routing table 120, updating of routing table is not permitted. In the case where the partition indicated by the PID field of the WD has been stored in the routing table 120, updating of the routing table is not permitted. That is to say, in the case where an issue-source node is not stored in the routing table, only the issue-source node itself is permitted to be stored/written.

By the above-described embodiment, it is possible to reduce occurrences of, if not prevent, situations in which transfer data that should be transferred to a second node included a same partition as that of a first node is mistakenly transferred to a third node included in a partition different from the partition including the first node due to an erroneous update having been performed upon the routing table 120. Also, it is possible to reduce occurrences of, if not prevent, situations in which the first node to update an entry of the routing table is included in a partition different from a partition including a first node. That is to say, it is possible to reduce occurrences of, if not prevent, updating the routing table 120 in a manner affecting a partition other than a partition including the issue-source node.

In FIG. 1A, when transfer data from a node reaches the crossbar 100, the transfer data is passed to the router 110 through the port corresponding to the node that has issued the transfer data. The router 110 compares T field of the received transfer data with NID field of the routing table 120, and extracts an entry of the routing table 120 which corresponds to the NID recorded in the T field. The router 110 then sends the transfer data to the transfer destination node through the port indicated by the Port field of the extracted entry.

On the other hand, when a write packet is transmitted from a node and reaches the crossbar 100, the write packet is transferred to the router 110 through the port corresponding to the write-packet-issue source node. The transfer destination of the write packet is the crossbar 100, thus the T field of the write packet indicates the crossbar 100. The router 110 determines that the T field of the transferred write packet indicates the crossbar 100 so that the router 110 identifies the transferred packet as a write packet. When the router 110 identifies the transferred packet as a write packet, the router 110 transfers the write packet to the register-access-control circuit 130. The register-access-control circuit 130 appropriately updates the routing table 120.

The register-access-control circuit 130 has a determination circuit 135. The determination circuit 135 determines whether or not to permit the WD in the write packet to update the routing table 120. If updating of the routing table 120 by the WD is permitted as a result of the determination, the register-access-control circuit 130 updates the routing table 120 in accordance with the WD.

FIGS. 2, 3, 4, 5, and 6 are circuit diagrams illustrating examples of the determination circuit 135. The register-access-control circuit 130 includes a decoder 131 and a determination circuit 135 illustrated in FIGS. 2, 3, and 4. The determination circuit 135 includes an AND circuit A1 illustrated in FIG. 2, AND circuits A2, A3, and A4, a comparison circuit C1, and an OR circuit O1 illustrated in FIG. 3, comparison circuits C2 and C3, and AND circuits A5 and A6 illustrated in FIG. 4. The determination circuit 135 further includes comparison circuits C41 to C4N and C51 to C5N, AND circuits A71 to A7N, A8, and an OR circuit O2 illustrated in FIG. 5. The determination circuit 135 further includes comparison circuits C61 to C6N and C71 to C7N, OR circuits O31 to O3N, AND circuits A91 to A9N, an OR circuit O4, and an AND circuit A10 illustrated in FIG. 6. That is to say, the single determination circuit 135 has individual circuits in FIGS. 2, 3, 4, 5, and 6.

Figure 2:
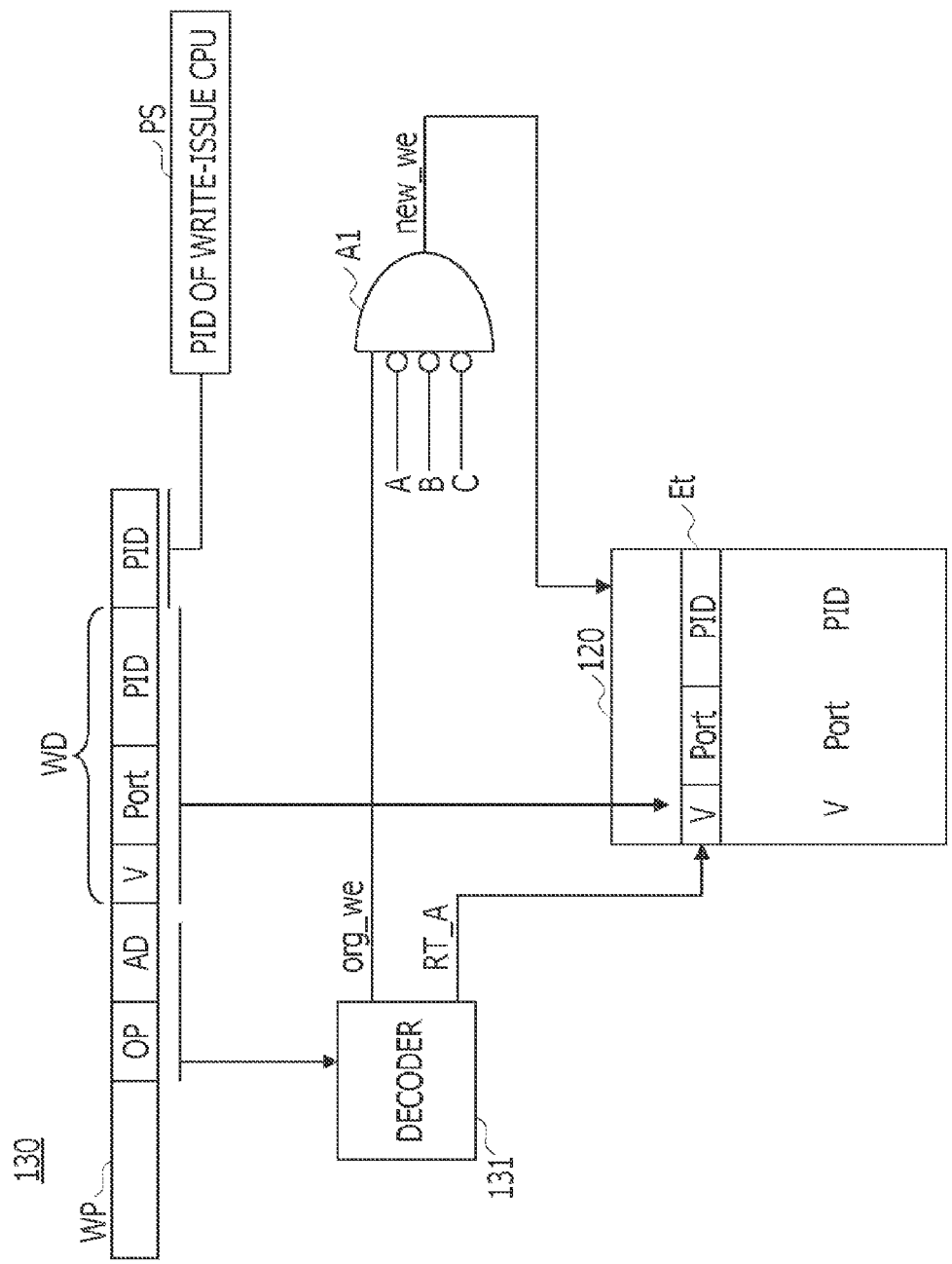
FIG. 2 illustrates an example of a configuration of a determination circuit.

FIG. 2 illustrates a circuit diagram of the determination circuit 135 which functions when partition information on a partition to which an issue-source node pertains is included in a write packet. In FIG. 2, the decoder 131 generates a first update enable signal org_we based on an operation code of the OP field in the write packet WP. The decoder 131 generates an entry-update enable signal from the operation code, and calculates an address of an update-target entry Et in the routing table 120 based on an address indicated by the AD field of the write packet WP. Each entry of the routing table 120 is disposed for each port of the crossbar. An entry indicated by a result RT_A produced by the decoder 131 having decoded the AD field is the update-target entry Et.

In FIG. 2, the AND circuit A1 receives a first update enable signal org_we and generates a second update enable signal new_we based on conditions that cancels input update enabling. In the case where the first update enable signal org_we to be input into the AND circuit A1 in FIG. 2 is asserted, and if none of update-cancel conditions A, B, and C are satisfied, the second update enable signal new_we is asserted. When the second update enable signal new_we is asserted, the contents of the update-target entry Et by the contents of the WD is updated. FIG. 2 illustrates a circuit diagram that functions in the case where information of a partition to which the issue-source node pertains is included in the write packet. The partition information is stored in the PID field of the write packet WP disposed separately from the WD. The determination circuit 135 obtains the PID in the write packet WP as partition information PS.

As illustrated in FIG. 2, the first update enable signal org_we, the inverted signal of the condition A, the inverted signal of the condition B, and the inverted signal of the condition C, described later, are input into the AND circuit A1. When the first update enable signal org_we is asserted, and none of the condition A, the condition B and the condition C are satisfied, the AND circuit A1 asserts the second update enable signal new_we. When the second update enable signal new-we is asserted, updating of the entry is permitted.

FIG. 3 illustrates a circuit diagram of the determination circuit 135 functioning in the case where information on a partition to which an issue-source node pertains is not included in a write packet. In the same manner as FIG. 2, the decoder 131 in FIG. 3 issues a first update enable signal org_we based on the operation code of the OP field in the write packet WP. The decoder 131 generates an entry-update enable signal from the operation code, and calculates an address of the update-target entry Et in the routing table 120 based on the address indicated by the AD field of the write packet WP.

Among the elements illustrated in FIG. 3, the AND circuit A4 adds a condition canceling update enable to the first update enable signal org_we, and generates a second update enable signal new_we. When the update enable signal in FIG. 2 and the second update enable signal new_we are asserted, the contents of the update-target entry Et is updated to the contents of the WD.

As illustrated in FIG. 3, the inverted signal of the condition A, the inverted signal of the condition B, and the inverted signal of the condition C are input into the AND circuit A2. Further, a value of the V field of the entry (hereinafter referred to as an "entry of the issue-source node") Es whose NID field indicates the NID of the issue-source node stored in the routing table 120 is input into the AND circuit A2. In the case where none of the condition A, the condition B and the condition C are satisfied, and the value of the V field of the entry Es of the issue-source node is "1", that is to say, when the entry Es is "valid", the AND circuit A2 asserts the output signal. If the entry Es of the issue-source node is valid, that means that the entry Es of the issue-source node is stored in the routing table. If the V field of the entry Es of the issue-source node is "0", that is to say, if the entry Es is invalid, it means that the issue-source node is not stored in the routing table. For example, in FIG. 1B, the V field having an entry of NID=15 is "0", and thus the node having NID=15 is not stored in the routing table.

A comparison circuit C1 compares the NID of the issue-source node and the NID of the entry to be updated, and if both of them match, the comparison circuit C1 outputs "1". The AND circuit A3 receives input of the below-described inverted signal of the condition D, a signal indicating a comparison result by the comparison circuit C1 between the NID of the issue-source node and the NID indicated by the NID field of the update-target entry Et, and the inverted signal of the value of the V field of the entry Es of the issue-source node. In the case where the condition D is not satisfied, the NID of the issue-source node, as a comparison result from the comparison circuit C1, matches the NID indicated by the NID field of the update-target entry Et, and the entry Es of the issue-source node is invalid, the AND circuit A3 asserts the output signal.

The OR circuit O1 asserts the output signal if at least either the output signal of the AND circuit A2 or the output signal of the AND circuit A3 is asserted.

By the functions of the AND circuits A2, A3, and A4 and the OR circuit O1, illustrated in FIG. 3, the second update-permission signal new_we is asserted, and updating of the entry is permitted under the conditions 1) or 2) shown as follows.

1) The output signal of the AND circuit A2 indicates that none of the conditions A, B, and C are satisfied, and the entry Es of the issue-source node is valid.

2) The output signal of the AND circuit A3 indicates that the condition D is not satisfied, the NID of the issue-source node and the NID indicated by the NID field of the update-target entry Et match as a comparison result of the comparator C1, and the entry Es of the issue-source node is invalid.

In this case, it is assumed that the first update-permission signal org_we is asserted.

In the following, descriptions will be given of the individual conditions A, B, C, and D.

Descriptions of the condition A and the condition B will be given with reference to FIG. 4.

The condition A is a condition for not permitting updating of the entry in the case where a valid entry pertaining to a partition different from a partition to which the issue-source node pertains is attempted to be updated. As illustrated in FIG. 4, the comparison circuit C3 compares the partition indicated by the PID field of the update-target entry Et and the partition indicated by the partition information PS to which the issue-source node pertains.

In the case where the partition indicated by the PID field of the update-target entry Et and the partition to which the issue-source node pertains are determined to be different as a comparison result of the comparison circuit C3, and the update-target entry Et is valid, the AND circuit A6 asserts a signal of the condition A, that is to say, the condition A is satisfied. If the condition A is satisfied, it means that a valid entry pertaining to a partition different from a partition to which the issue-source node pertains is attempted to be updated, and thus in this case, updating of the entry is not permitted.

The condition B is a condition for not permitting updating the entry in the case where the WD is valid, and the partition indicated by the PID field of the WD and the partition to which the issue-source node pertains are different. As illustrated in FIG. 4, the comparison circuit C2 compares the PID field of the WD and the partition information PS indicating the partition to which the issue-source node pertains. The partition information PS indicating the partition to which the issue-source node pertains is stored in the PID field (refer to FIG. 2) of the write packet WP provided separately from the WD.

In the case where the partition indicated by the PID field of the WD and the partition to which the issue-source node pertains are determined to be different as a comparison result of the comparison circuit C2, and the WD is valid, the AND circuit A5 asserts a signal of the condition A, that is to say, the condition B is satisfied. If the condition B is satisfied, it means that the WD is valid, and the partition indicated by the PID field of the WD and the partition to which the issue-source node pertains are different. Thus, in this case, updating of the entry is not permitted. In the case where an entry pertaining to a partition different from the partition to which the issue-source node pertains is attempted to be updated, that entry is not permitted to be updated.

Next, a description will be given of the condition C with reference to FIG. 5.

The condition C is a condition for not permitting updating of the entry in the case where the port indicated by the port field of the WD is stored in the routing table 120, and the partition indicated by the PID field of the WD and the partition field of the stored entry and the partition to which the issue-source node pertains are different.

The circuit illustrated in FIG. 5 has N comparison circuits C41 to C4N, and N comparison circuits C51 to C5N. The comparison circuits C41 to C4N and the comparison circuits C51 to C5N correspond to entries E1 to EN of the routing table, respectively. The comparison circuits C41 to C4N compare the Port fields of the WDs and the Port fields of the corresponding entries of the routing table 120, respectively. The comparison circuits C51 to C5N compare the PID field of the WD and the partition fields of the corresponding entries of the routing table 120, respectively.

The circuit illustrated in FIG. 5 further has N pieces of AND circuits A71 to A7N. The AND circuits A71 to A7N individually assert output signals, respectively for the corresponding entries E1 to EN of the routing table 120 in the case where the output signal of the C51 to C5N indicate that the entries pertain to the partition that is different from the partition of the WD, the output signals of the C41 to C4N indicate that the entries are the WD port entries, and the target entries are valid entries. The AND circuit A8 asserts the signal of the condition C, namely the condition C is satisfied in the case where the WD is valid, the partition to which a valid update-target entry pertains is attempted to be updated to pertain to a different partition. That is to say, if the condition C is satisfied, it means the case in which a valid entry is updated while keeping it valid, and the partition is changed. Accordingly, as a result, updating of an entry so as to "change partition" is not permitted.

The following three modes are considered as modes for changing a partition.

A first mode is a mode in which an entry pertaining to a partition to which the issue-source node pertains is updated.

A second mode is a mode in which an entry pertaining to a partition different from the partition to which the issue-source node pertains is updated to an entry of a partition to which the issue-source node pertains.

A third mode is a mode in which an entry pertaining to a partition different from the partition to which the issue-source node pertains is updated to an entry of a partition different from the partition to which the issue-source node pertains.

The second and third modes correspond to the case where the partition to which the update-target entry pertains is different from the partition to which the issue-source node pertains. Accordingly, in the second mode or the third mode, when the condition C is satisfied, updating of the entry is not permitted, so that circumstances of updating of the entry while the entry is kept valid when the partition to which the update-target entry pertains is different from the partition to which the issue-source node pertains can be avoided if not prevented. As a result, circumstances of a partition different from the partition to which the issue-source node pertains being updated to an entry being used can be avoided if not prevented.

A description will be given of the condition D with reference to FIG. 6. The condition D is a condition for not permitting updating of an entry in the case where the issue-source node is not stored in the routing table 120, and at least either of a partition or a port is to be written into the routing table 120.

Among elements illustrated in FIG. 6, the comparison circuits C61 to C6N compare the Port field of the WD and the Port fields of the entries E1 to EN corresponding to the comparison circuits C61 to C6N, respectively. The comparison circuits C71 to C7N compare the PID field of the WD and the partition fields of the entries E1 to EN corresponding to the comparison circuits C71 to C7N, respectively.

The OR circuits O31 to O3N assert the respective output signals with respect to the corresponding entries E1 to EN in the case where at least one of a port or a partition stored in an entry matches the WD based on the outputs of the comparison circuits C61 to C6N and the comparison circuits C71 to C7N.

The AND circuits A91 to A9N assert the output signals with respect to the corresponding entries E1 to EN in the case where at least one of a port or a partition stored in an entry matches the WD, and the corresponding entry is valid in response to the outputs of the OR circuits O31 to O3N.

The OR circuit O4 assets the output signal in the case where at least one of a port or a partition stored in the entry matches the WD, and there is a valid entry, in response to the outputs of the AND circuits A91 to A9N.

The AND circuit A10 asserts the signal of the condition D, that is to say, the condition D is satisfied in the case where at least one of a port or a partition matches the WD, the output of the OR circuit O4 indicates that there is a valid entry, and the WD is valid. Accordingly, the condition D is satisfied in the case where at least one of a port or a partition matches the WD, there is a valid entry, and the WD is valid.

The condition D is applied to the circuit in FIG. 3. Among the elements illustrated in FIG. 3, the AND circuit A3 asserts the output signal in the case where the condition D is not satisfied, the output of the C1 circuit indicates updating the entry of the issue-source node, and the entry Es of the issue-source node is invalid. The AND circuit A3 asserts the output signal so that updating of the entry is permitted. If the entry Es of the issue-source node is invalid, it means that the issue-source node is not stored in the routing table 120. Accordingly, when the condition D is satisfied, even if the issue-source node is not stored in the routing table 120, updating of the entry of the routing table is not permitted.

A description will be given of the condition Ea with reference to FIG. 3. The condition E is a condition for not permitting the entry in the case where the NID of the issue-source node has not been stored in the routing table 120, that is to say, the entry of the issue-source node in the routing table 120 is invalid, and the NID of the issue-source node and the NID of the WD do not match, that is to say, an entry of the node other than the issue-source node is attempted to be updated.

The condition E is also applied to the circuit in FIG. 3. Among the elements illustrated in FIG. 3, the AND circuit A3 asserts the output signal in the case where the condition D is not satisfied, the output of the C1 circuit indicates updating the entry of the issue-source node, and the entry Es of the issue-source node is invalid. The AND circuit A3 asserts the output signal so that updating the entry is permitted. If the entry Es of the issue-source node is invalid, it means that the issue-source node is not stored in the routing table 120. Accordingly, even when the NID of the issue-source node is not stored in the routing table 120, the entry of a node other than the issue-source node is attempted to be updated, updating of the entry of the routing table is not permitted.

Figure 7B:
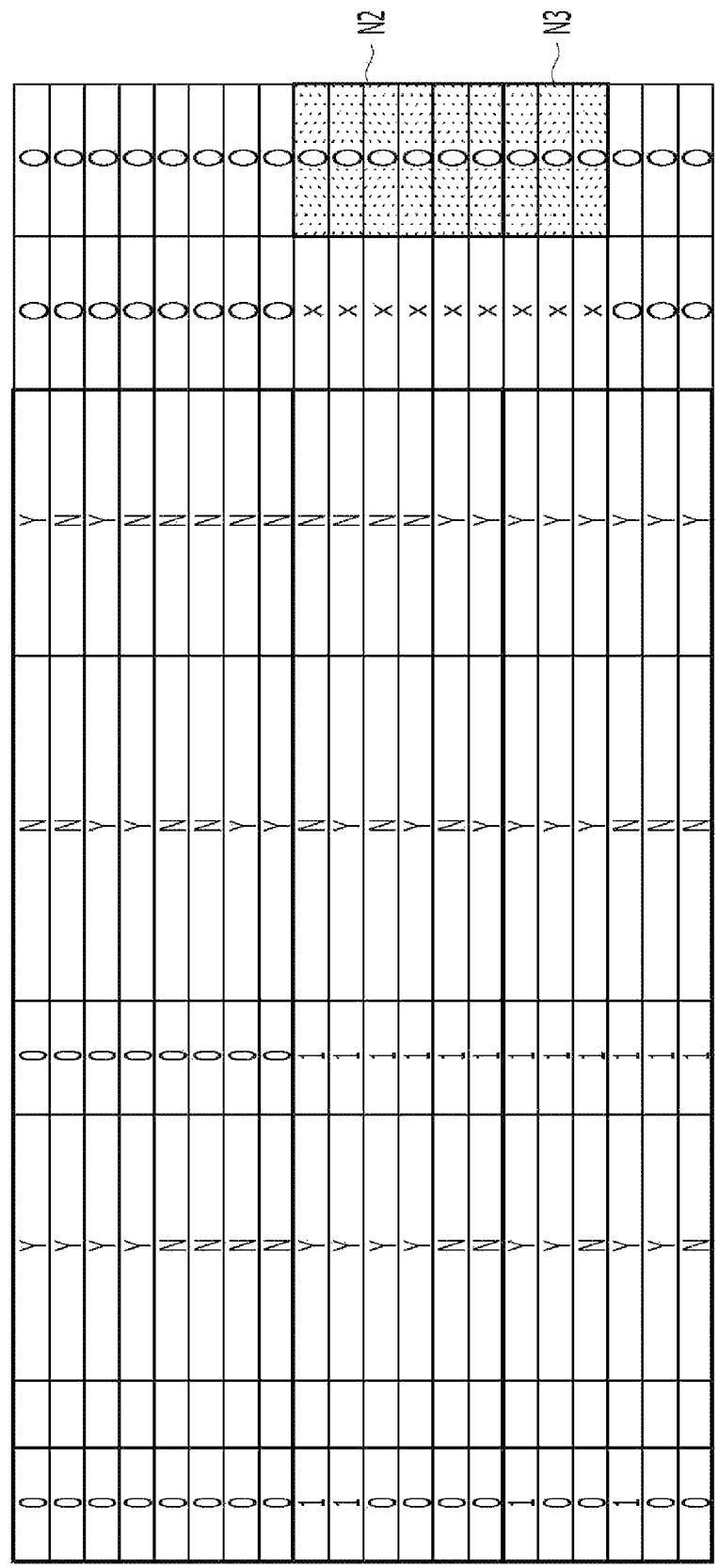

FIGS. 7A, 7B and 8 indicate the routing table 120 before updated by a write packet and the WD. FIGS. 7A, 7B and 8 also indicate whether or not updating an entry of the routing table is permitted in each example. A determination on whether updating of an entry is permitted or not is shown in comparison with the case of the above-described embodiment and the case of reference examples. The reference examples show examples in which a function of the write-permission determination circuit 135 according to the embodiments are not provided.

In the routing table 120 before updated and the WD if the valid field and the V field are both 0, the contents of individual fields of the Port and the Partition of the routing table and the contents of the Port, and the PID of the WD are invalid, and are meaningless.

FIGS. 7A and 7B show an example in which partition information of the issue-source node is stored in the routing table 120. FIG. 8 shows an example in which partition information of the issue-source node is not stored in the routing table 120.

Under the conditions shown by N1 in FIG. 7A, in the case of the reference example, if the partition indicated by the partition field of the update-target entry and the partition to which the issue-source node pertains are different, updating of the entry of the routing table is permitted. In contrast, even under the same condition, in the case of the embodiment, updating of the entry of the routing table is not permitted when the partition indicated by the partition field of the update-target entry and the partition to which the issue-source node pertains are different.

Also, as shown by N2 in FIG. 7B, in the case where the partition shown by the PID field of the WD and the partition to which the issue-source node pertains are different, updating of the entry is permitted in the reference example, but is not permitted in the embodiment.

Further, as shown by N3 in FIG. 7B, in the case where the port indicated by the Port field of the WD has been already used by another partition, updating of the entry is permitted in the reference example, but is not permitted in the embodiment.

As shown by N4 in FIG. 8, in the case where the port indicated by the Port field of the WD or the partition indicated by the PID field has already been stored in the routing table 120 and is used, updating of the entry is permitted in the reference example, but is not permitted in the embodiment.

Also, as shown by N5 in FIG. 8, in the case where the NID indicated by the NID field of the update-target entry and the NID of the issue-source node are different, updating of the entry is permitted in the reference example, but is not permitted in the embodiment.

In this manner, by the function of the write-permission determination circuit 135 according to the embodiment, control is performed not to permit updating of an entry of the routing table in a manner affecting another partition.

FIG. 9 is a diagram illustrating a more detailed configuration of individual ports Pa to Pd, in particular, of the crossbar 100 illustrated in FIG. 1A. For convenience of description, in FIG. 9, the port Pe, illustrated in FIG. 1A, is omitted.

As illustrated in FIG. 9, each of the ports Pa to Pd has an input buffer and an output buffer. Transfer data having been transferred from each of the nodes 11 to 14 is once stored in the input buffer corresponding to the transfer source node, and then is passed to the router 110. In the same manner, the transfer data passed from the router to each of the ports Pa to Pd is once stored into an output buffer of that port, and then is transferred to each of the nodes 11 to 14 connected to that port, respectively.

FIG. 10 is a flowchart illustrating an operation of updating a routing table performed by the write-permission determination circuit 135 according to an embodiment. Conditions A to E illustrated in FIG. 10 illustrate the conditions A to E illustrated in FIGS. 2 to 6, respectively.

In S1 in FIG. 10, whether the partition to which the transfer-data issue source node pertains has been stored in the routing table 120 or not is determined. In the case where the partition to which the issue-source node has not been stored in the routing table (NO in S1), whether the information of the partition to which the issue-source node pertains is included in the write packet or not is determined in S2. When the determination result of S2 is NO, whether the condition D is satisfied or not is determined in S10.

When the determination result of S10 is YES, updating of the entry of the routing table is not permitted (S11). On the other hand, when the determination result in S10 is NO, whether the condition E is satisfied or not is determined (S12).

When the determination result of S10 is YES, updating of an entry of the routing table is not permitted (S13). On the other hand, when the determination result in S12 is NO, updating of the entry of the routing table is permitted (S14).

On the other hand, when the determination result of S1 or S2 is YES, whether condition A is satisfied or not is determined in S3. When the determination result in S3 is YES, updating of the entry of the routing table is not permitted (S4). On the other hand, when the determination result in S3 is NO, whether the condition B is satisfied or not is determined in S5.

When the determination result in S5 is YES, updating of the entry of the routing table is not permitted (S6). On the other hand, when the determination result in S5 is NO, whether the condition C is satisfied or not is determined in S7.

When the determination result in S7 is YES, updating of the entry of the routing table is not permitted (S8). On the other hand, when the determination result in S7 is NO, updating of the entry of the routing table is permitted (S9).

A detailed description will be given of update operation of the routing table, performed by the write-permission determination circuit 135, using FIGS. 11A and 11B. S31 in FIG. 11A corresponds to S2 in FIG. 10, and S32 in FIG. 11A corresponds to S1 in FIG. 10. Also, S33, S36, S37, and S38 in FIG. 11A individually correspond to S10 in FIG. 10. Also, step S34 in FIG. 11A corresponds to step S12 in FIG. 10, step S39 in FIG. 11A corresponds to S11 and S13 in FIG. 10, and S35 in FIG. 11A corresponds to S14 in FIG. 10. Further, S51 and S52 in FIG. 11B correspond to S3 in FIG. 10, S53 and S54 in FIG. 11B individually correspond to S5 in FIG. 10, and S55, S56, S57, and S58 in FIG. 11B individually correspond to S7 in FIG. 10. Also, S60 in FIG. 11B corresponds to S4, S6, and S8 in FIG. 10, and S59 in FIG. 11B corresponds to S9 in FIG. 10.

Figure 11A:
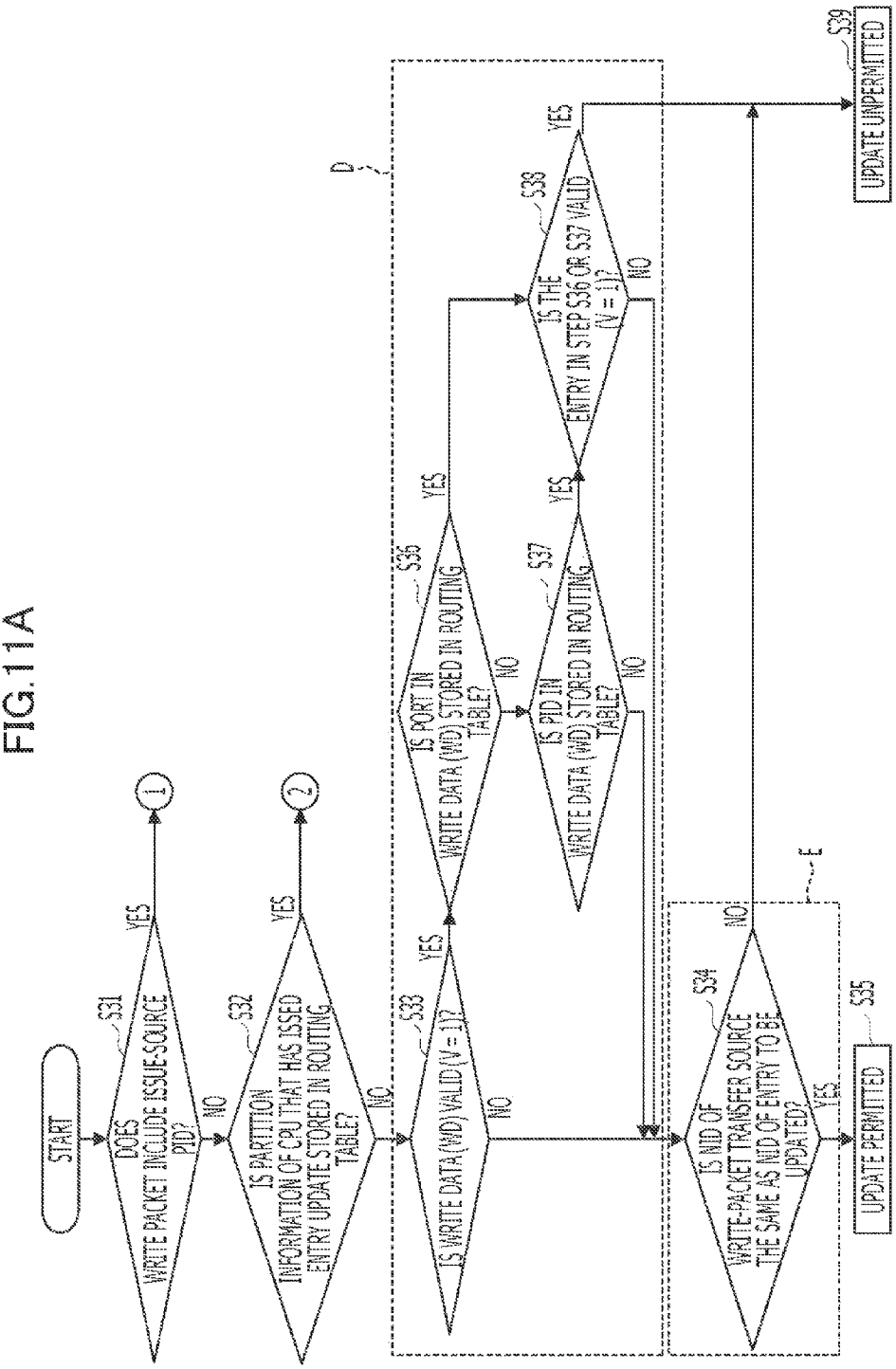
FIG. 11A is a flowchart illustrating a method of updating a routing table according to an embodiment.

In S31 in FIG. 11A, whether information of the partition to which the issue-source node pertains is included in the write packet or not is determined. If the determination result in S31 is NO, whether information of the partition to which the issue-source node pertains has been stored in the routing table 120 or not is determined in S32. If the determination result in S32 is NO, whether the V field of the WD is "1" or not is determined in S33.

If the determination result in S33 is NO, whether the NID indicated by the NID field of the WD matches the NID of the update-target entry or not is determined in S34. If the determination result in S34 is YES, updating of the entry of the routing table is permitted in S35. Also, if the determination result in S34 is NO, updating of the entry of the routing table is not permitted in S35.

On the other hand, if the determination result in S33 is YES, whether the port indicated by the port field of the WD has been stored in the routing table 120 or not is determined in S36. If the determination result in S36 is NO, whether the partition indicated by the PID field of the WD has been stored in the routing table 120 or not is determined in S37. If the determination result in S37 is NO, S34 is performed.

Also, if the determination result in S36 or S37 is YES, S38 is performed. In S38, whether the Valid field of the entry that has been determined to be stored in the routing table 120 in S36 or in S37 is "1" or not is determined. If the determination result in S38 is NO, S34 is performed, and if the determination result in S38 is YES, updating of the entry of the routing table is not permitted (S39).

Figure 11B:
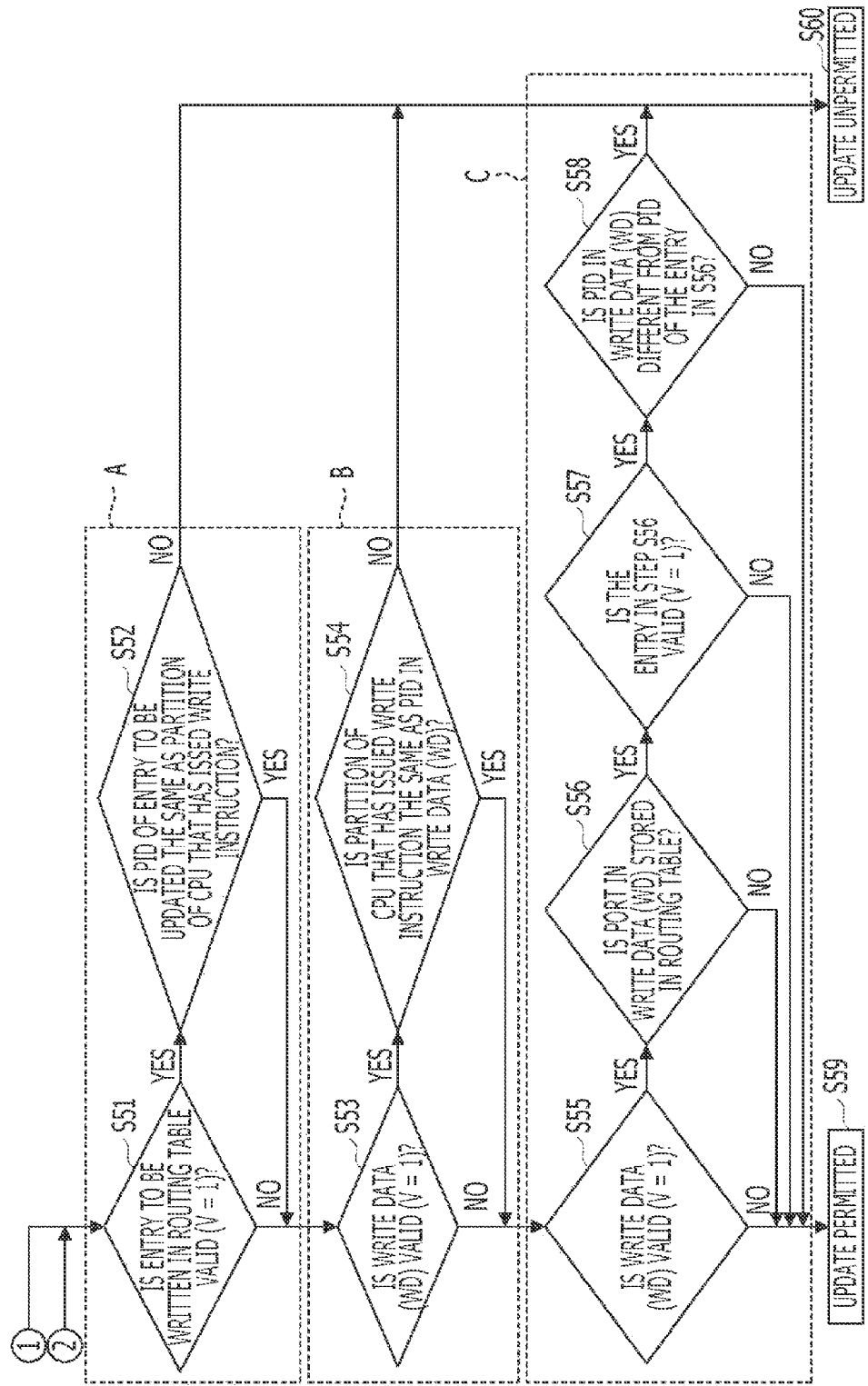
FIG. 11B is a flowchart illustrating a method of updating a routing table according to an embodiment.

If the determination result in S31 or S32 in FIG. 11A is YES, S51 in FIG. 11B is performed. In S51, whether the Valid field of the update-target entry in the routing table 120 is "1" or not is determined.

If the determination result in S51 is YES, whether the partition indicated by the partition field of the update-target entry in the routing table 120 matches the partition to which the issue-source node pertains or not is determined. If the determination result in S52 is YES, or if the determination result in S51 is NO, S53 is performed. On the other hand, if the determination result in S52 is NO, updating of the entry of the routing table is not permitted (S60).

In S53, whether the V field of the WD is "1" or not is determined. If the determination result in S53 is YES, whether the partition indicated by the PID field of the WD matches the partition to which the issue-source node pertains or not is determined. If the determination result of S54 is YES, or the determination result of S53 is NO, S55 is performed. On the other hand, if the determination result in S54 is NO, updating of the entry of the routing table is not permitted (S60).

In S55, whether the V field of the WD is "1" or not is determined. If the determination result of S55 is YES, whether the port indicated by the port field of the WD has been stored in the routing table 120 or not is determined. If the determination result of S56 is YES, S57 is performed.

In S57, whether the Valid field of the entry S56 that has been determined to be stored in the routing table 120 is "1" or not is determined. If the determination result of S57 is YES, S58 is performed. In step S58, whether the partition indicated by the Partition field of the entry that has been stored in the routing table 120 in S56 matches the partition indicated by the PID field of the WD or not is determined. If the determination result of S58 is YES, updating of the entry of the routing table is not permitted (S60). On the other hand, if the determination result of any one of S55, S56, S57, and S58 is NO, updating of the entry of the routing table is permitted (S59).

In FIG. 10, execution order of S1 and S2 can be exchanged with each other. In the same manner, in FIG. 11A, execution order of S31 and S32 can be exchanged with each other. Also, in FIG. 10, execution order of S10 and S12 can be exchanged with each other. In the same manner, in FIG. 11A, execution order of a group ("D" in FIG. 11A) of S33, S36, S37, and S38 and S34 ("E" in FIG. 11A) can be exchanged with each other.

In FIG. 10, execution order can be exchanged freely among S3, S5, and S7. In the same manner, in FIG. 11B, execution order can be exchanged freely among a group ("A" in FIG. 11B) of S51 and S52, a group ("B" in FIG. 11B) of S53 and S54, and a group ("C" in FIG. 11B) of S55, S56, S57, and S58. Further, execution order can be exchanged freely between S55 and S56. In the same manner, execution order can be exchanged freely between S57 and S58.

With reference to FIG. 12, a description will be given of an example causing a computer to perform a method of updating the routing table, which has been described in FIGS. 10, 11A, and 11B.

As illustrated in FIG. 12, a computer 500 functioning as the write-permission determination circuit 135 has a CPU 501, which performs various operations by executing instructions included in a given program, and an operation section 502. Also, the computer 500 has a memory 504, such as a RAM, a ROM, etc., which stores programs executed by the CPU 501, data, etc., or which is used as a working area. The computer 500 has an interface 508 for downloading programs from external servers through a communication network 509, such as the Internet, a LAN, etc. In the computer 500, a program causing the computer to execute a method of updating routing table is stored in the memory 504. And the CPU 501 executes that program so that the write-permission determination circuit 135 is achieved by the computer 500.

What is claimed is:

1. A method of updating a routing table of an information transfer system, the system including a plurality of nodes, each of the nodes being associated with any one of a plurality of partitions, the nodes communicating with another node based on information set in the routing table, the method comprising:
   receiving, from an issue-source node, a write packet that includes update data for updating the routing table;
   determining whether first partition information indicating a partition with which the issue-source node is associated is included in the received write packet or in the routing table;
   determining not to permit updating of the routing table;
   when the first partition information is included in neither the received write packet nor the routing table and when either of port information or second partition information included in the update data has been stored in the routing table;
   determining to permit updating of the routing table when the first partition information is included in neither the received write packet nor the routing table, when neither the port information included in the update data nor the second partition information has been stored in the routing table, and when the issue-source node matches node information included in a corresponding entry in the routing table;
   determining not to permit updating of the routing table when the first partition information is included in either the received write packet or the routing table, and when the first partition information matches the second partition information, when the port information included in the update data has been stored in the routing table, and when the second partition information is different from partition information included in a corresponding entry in the routing table; and
   updating an entry of the routing table based on the update data when it is determined to permit updating the routing table.

2. The method of updating a routing table according to claim 1, further comprising:
   permitting the routing table to be updated when a partition including the issue-source node could not recognized, the update data is invalid, and the issue-source node matches node information included in a corresponding entry in the routing table.

3. The method of updating a routing table according to claim 1, further comprising:
   permitting the routing table to be updated when a partition including the issue-source node could not recognized, the issue-source node matches node information included in a corresponding entry in the routing table, and either (A) the port information included in the update data has not been stored in the routing table and the stored data is invalid or (B) partition information included in the update data has been stored in the routing table and the stored data is invalid.

4. The method of updating a routing table according to claim 1, further comprising:
   permitting the routing table to be updated when a partition including the issue-source node is recognized, the data in a corresponding entry in the routing table is valid, the partition including the issue-source node matches partition information included in the corresponding entry in the routing table, the update data is valid, the partition including the issue-source node matches the partition information included in the update data, and either the port information included in the update data is not stored in the routing table or the partition information included in the update data matches the partition information included in the corresponding entry in the routing table.

5. A data transfer apparatus connected to a plurality of nodes and operable to transfer data between the nodes, the apparatus comprising:
   a plurality of ports each of which is connectable to a node;
   a memory to store a routing table including information indicating a relationship between a node connected to any of the ports and a partition that includes the node; and
   a determination unit to determine whether to permit updating of the routing table, operability of the determination unit including the following,
      determining whether first partition information indicating a partition with which the issue-source node is associated is included in the received write packet or in the routing table;
      determining not to permit updating of the routing table when
      the first partition information is included in neither the received write packet nor the routing table and when either of port information or second partition information included in the update data has been stored in the routing table;
      determining to permit updating of the routing table when the first partition information is included in neither the received write packet nor the routing table, when neither the port information included in the update data nor the second partition information has been stored in the routing table, and when the issue-source node matches a node included in a corresponding entry in the routing table; and
      determining not to permit updating of the routing table when the first partition information is included in either the received write packet or the routing table, and when the first partition information matches the second partition information, when the port information included in the update data has been stored in the routing table, and when the second partition information is different from the partition information included in a corresponding entry in the routing table.

6. The data transfer apparatus according to claim 5, wherein the determination unit is further operable to permit the routing table to be updated when recognition of a partition including the issue-source node has failed, the update data is invalid, and the issue-source node matches a node included in a corresponding entry in the routing table.

7. The data transfer apparatus according to claim 5, wherein the determination unit is further operable to permit the routing table to be updated when recognition of a partition including the issue-source node has failed, the issue-source node matches the node included in the data to be updated, and either (A) the port information included in the update data has not been stored in the routing table and the stored data is invalid or (B) the partition information included in the update data has been stored in the routing table and the stored data is invalid.

8. The data transfer apparatus according to claim 5, wherein the determination unit is further operable to permit the routing table to be updated when recognition of a partition including the issue-source node has been successful, the data in a corresponding entry in the routing table is valid, the partition including the issue-source node matches the partition information included in the update data, and either port information included in the update data is not stored in the routing table or partition information included in the update data matches the partition information included in the corresponding entry in the routing table.

* * * * *